Dec. 1, 1931.  N. LESLIE  1,834,854
APPARATUS FOR THE TREATMENT OF ORES
Filed March 6, 1930

N. Leslie
INVENTOR

By: Marks & Clerk
ATTYS.

Patented Dec. 1, 1931

1,834,854

UNITED STATES PATENT OFFICE

NORMAN LESLIE, OF KOLAR, WESTBURY, TASMANIA, AUSTRALIA

APPARATUS FOR THE TREATMENT OF ORES

Application filed March 6, 1930, Serial No. 433,788, and in Australia March 11, 1929.

This invention relates to improvements in apparatus for the treatment of ores and refers more especially to apparatus for the treatment of ores containing precious metals.

The object of this invention is to provide an apparatus which is adaptable for the treatment of ores, and the recovery of precious metals therefrom in such manner that many intricate metallurgical operations may be performed therein, and the recovery of the precious metals readily effected.

The apparatus which is the subject of this invention is capable of being adapted for various metallurgical operations, such as hydraulic classification, concentration, separation by flotation, amalgamation, cyanidation and the electro-deposition of the precious metals contained in solution, such operations being capable of being carried out either alternatively or in succession as hereinafter indicated.

Broadly the invention comprises a cylindrical vessel having a conical bottom within which is mounted a vertically adjustable upcast pipe and a vertically adjustable air or water pipe provided with a nozzle, an adjustable valve in the apex of the said conical bottom controlling the entrance into an auxiliary chamber, means for maintaining communication between the said auxiliary chamber and an adjustable hydrostatic head, means for passing an electrolytic current between the said upcast pipe as anode and a mercury cathode in the apex of the said conical bottom of the cylindrical vessel.

Means are also provided for introducing flotation agents into the vessel whilst the ore pulp is subjected to a vigorous agitation.

By adjusting the height of the said upcast pipe and the nozzle delivering thereinto, together with the external hydrostatic head in communication therewith, ore pulp within the said vessel is subjected to a controlled and regulated agitation whereby a suitable classification or concentration of the heavier particles can be effected by gravity. These grades or concentrates of the heavier particles can be delivered into the auxiliary chamber by means of the valve controlling the opening in the conical bottom of the said vessel, or alternatively (after having effected a concentration in the apex of the said vessel of the ore particles containing the precious metals) by introducing a certain amount of mercury into the chamber the same may be circulated and agitated by means of the air jet whereby amalgamation of the precious metals can be effected alternatively a suitable solvent solution such as an alkaline cyanide (e. g. potassium cyanide) may be introduced into the vessel and agitated by means of the air jet, so that solution of the precious metals may be effected, and finally by passing an electric current through the said cyanide electrolyte from the upcast pipe as anode and an amount of mercury in the bottom of the said conical chamber as cathode the precious metal dissolved in the said cyanide electrolyte can be electro-deposited on the surface of the mercury, thereby being immediately amalgamated therewith.

In order that this invention may be better understood, I will now proceed to describe the same by reference to the accompanying drawings, which illustrate one practical embodiment of the invention.

Figure 3:
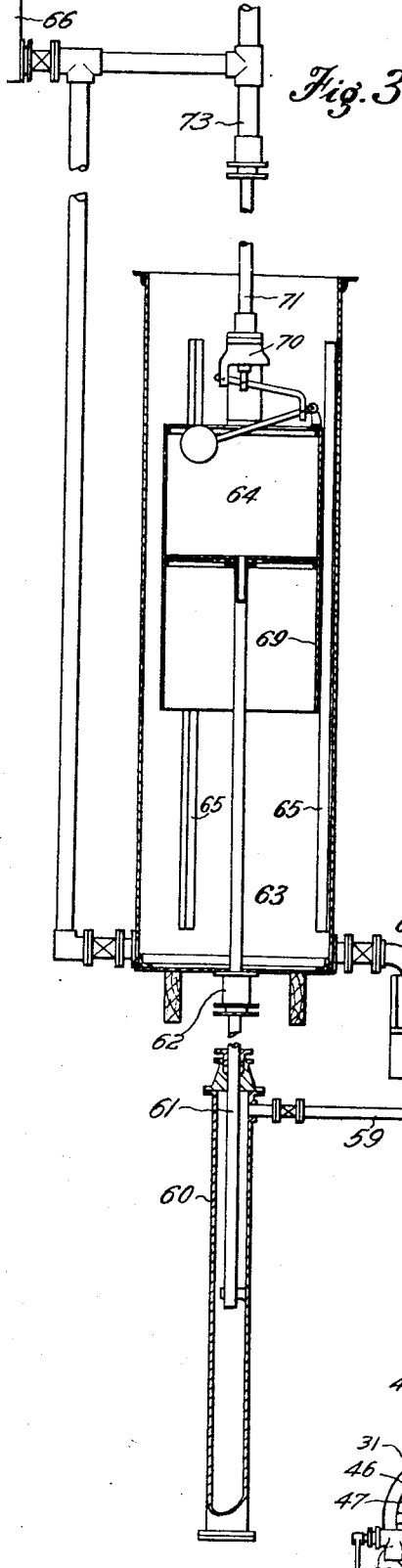
Figure 3 is a view in sectional elevation of a further portion of the apparatus adapted to permit of variations of hydrostatic pressure for a purpose to be described.
Figure 1:
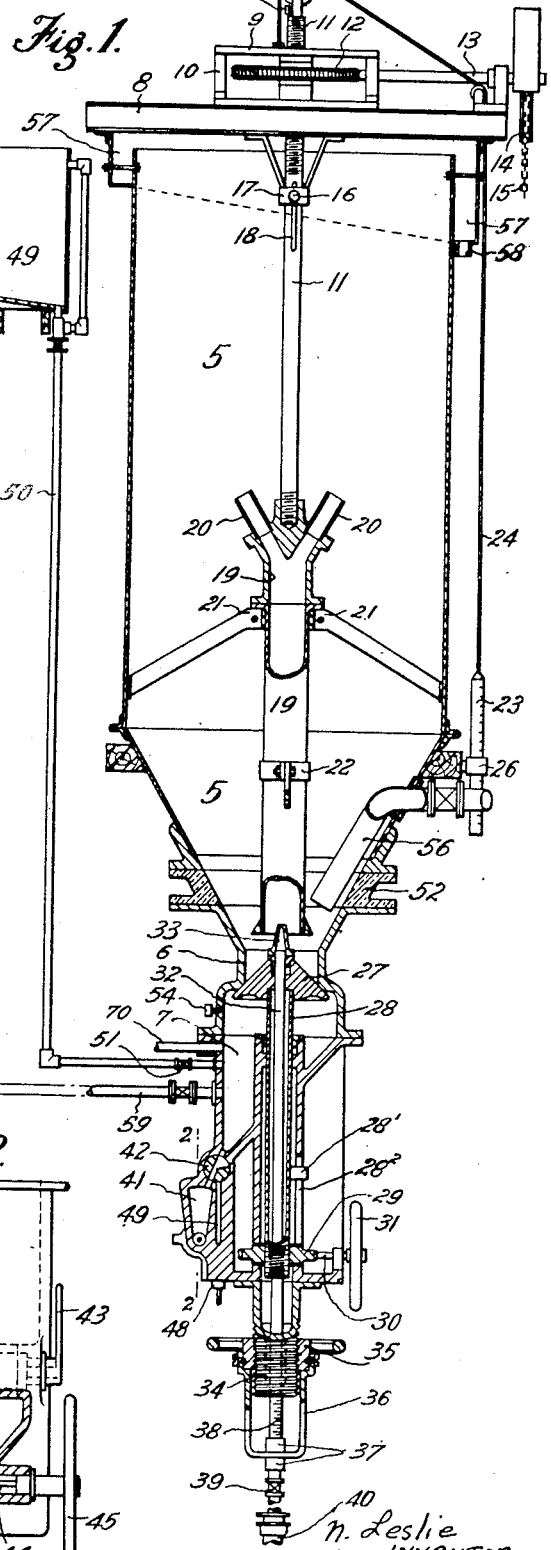
Figure 1 is a view in cross-sectional elevation of portion of the treating apparatus.

Referring to the drawings the reference numeral 5 designates a vertically arranged agitating chamber preferably of cylindrical formation and having a conical lower end communicating by means of a neck 6 with a second chamber 7 of relatively small size.

Suitable beams are arranged adjacent the open upper end of the chamber 5, in order to support a bearing bracket 9 having spaced bearings 10 through which passes the screwed upper end of a spindle 11 disposed coaxially within the chamber.

A worm wheel 12 is arranged between the spaced bearings of the bearing bracket 9 and the bore thereof is screwed to engage the screwed spindle 11.

The worm wheel 12 is engagd by a worm (not shown) fitted to a horizontal spindle 13 mounted in suitable bearings and having a sprocket 14 fitted to its outer end.

An endless chain 15 passing around the sprocket 14 permits of motion being imparted thereto from any convenient position therebelow.

The spindle 11 is prevented from rotating by means of a set screw 16 mounted in a collar 17 rigidly secured to the beam 8 and engaging a slot 18 disposed longitudinally in the said spindle.

It will thus be understood that, when motion is imparted to the worm wheel by the means above described, the spindle 11 is raised or lowered.

An upcast pipe 19 is mounted in the lower part of the chamber 5 being capable of vertical adjustment. To this end the upcast pipe 19 is secured to the lower end of the spindle 11 and the upper end thereof is formed with a plurality of upwardly inclined branches to which discharge pipes 20 are fitted.

The upcast pipe 19 is guided by means of centrally disposed bearings 21 and 22 secured by approved means to the interior surface of the chamber 5.

The vertical displacement of the spindle 11 and upcast pipe 19 may be indicated by means of a member 23 supported by a cord 24 secured at its opposite end to the bearing bracket 9 and passing over a pulley 25 on the upper end of the spindle 11.

The indicating member 23 preferably passes through a fixed ring 26 mounted adjacent to the chamber 5 and the said member may be graduated whereby the position of the upcast pipe 19 may be ascertained.

A conical valve 27 arranged coaxially with the chambers 5 and 7 is adapted to engage a seating on the lower portion of the neck 6 whereby the said chambers may be isolated when required.

The valve 27 is fitted to the upper end of a tubular stem 28 which passes through a packing gland in a guide bearing 29 formed integrally with the inclined bottom of the chamber 7.

The lower end of the tubular stem 28 is screwed externally and is engaged by the screwed bore of a rotatively mounted worm wheel 29 to which motion is imparted through a worm on a spindle 30 operated by means of a hand wheel 31.

The tubular stem 28 is provided with a radial projection 29 operating within a slot 30 in the surrounding sleeve whereby annular motion is prevented.

It will thus be readily apparent that the valve 27 is opened and closed by the manipulation of the handwheel 31, and its movement indicated by the movement of projection 29.

A pipe 32 for the supply of compressed air arranged within the hollow stem 28 of the valve passes through a packing gland in the valve 27 and is provided at its upper projecting end with a nozzle 33 arranged coaxially with the upcast pipe 19.

The lower end of the air pipe 32 projects from the lower end of an elongated bearing 34 arranged below the member forming the chamber 7 and the said bearing is screwed externally and is engaged by the screwed bore of a handwheel 35.

A U-shaped strap 36 secured to the handwheel 35 embraces the air pipe 32 and the latter is provided with collars 37 adapted to prevent relative movement therebetween. It will thus be seen that the rotation of the hand whel 35 causes the air pipe to be raised or lowered.

Graduations 38 are provided on the air pipe for indicating the position of the nozzle 33.

A valve 39 is provided in the air pipe below the collars 37 and the said air pipe passes through a packing gland into a compressed air main 40.

Alternatively the air pipe may be connected to the main by means of flexible tubing.

A discharge chamber 41 formed integrally with the auxiliary chamber 7 is arranged below and is proximity thereto and is adapted to be placed in communication therewith by means of a three-way cock 42 operable by a hand lever 43.

A worm conveyor 44 arranged horizontally at the bottom of the discharge chamber 41 and operable by a handwheel 45 is adapted to discharge the contents through an opening 46 which is normally closed by a door 47.

A discharge cock 48 fitted to the side of the chamber 7 communicates with a passage 49 leading to the three way cock 42 and by means of which it may be placed in communication with the chamber 7.

Mercury may be supplied to the chamber 7 from a reservoir 49ª by means of a pipe 50 provided with a cock 51. The reservoir is arranged at a sufficient height to permit of mercury being run into the chamber against the pressure in the agitator.

In order that electrolytic operations may be performed with the apparatus, the chamber 5 and upper structure including the upcast pipe is insulated from the lower portion by means of a member 52 of insulating material forming part of the cone shaped lower end of the chamber.

When the apparatus is employed for electrolysis, current may be passed by means of a terminal 53 to the upcast pipe 19, which serves as the anode. Mercury supplied to the auxiliary chamber 7 and filling the neck 6 affords a suitable cathode and is in electrical contact with a second terminal 54 secured to the auxiliary chamber 7.

A pipe 56 is arranged within the lower end of the chamber 5 and is provided with an externally disposed cock whereby the ore pulp in the chamber may be extracted either by means of a pump or by siphonic action.

An overflow launder 57 provided with a discharge outlet 58 is arranged adjacent to the upper end of the chamber 5.

Figure 2:
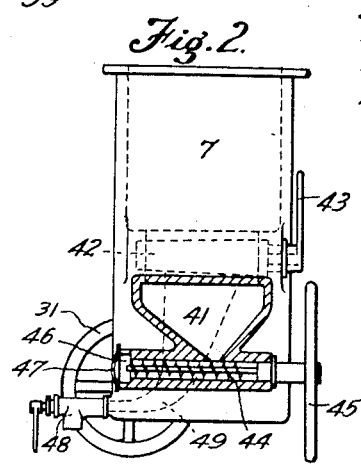
Figure 2 is a view in cross-section taken on the dotted line 2—2 of Figure 1.

The device illustrated in Figure 2 of the drawings is employed to vary the hydrostatic pressure in the chamber 7 of the apparatus and for this purpose a pipe 59 provided with suitable cocks is adapted to connect the said chamber to a vertically disposed cylinder 60 which is closed at the lower end and provided at the top with a packing gland for a coaxially arranged pipe 61.

The pipe 61 passes through a packing gland 62 at the lower end of a vertical chamber 63 and is connected to a float chamber 64 adapted to be adjusted vertically within the chamber 63.

Guides 65 are provided in chamber 63 for retaining the float chamber in a central position.

Water is supplied to the chamber 63 from a feed reservoir 66 and a discharge pipe 67 is provided for discharging water when desired so that the level in the chamber may be raised and lowered as desired.

An annular depending skirt 69 is provided on the adjustable float chamber thereby providing a compartment adapted to form a buoyant air pocket when water is admitted to the chamber 63.

The water in the adjustable chamber 64 is maintained at a constant level by means of a float controlled valve 70 secured to the said chamber and connected to a pipe 71 passing through a packing gland into a pipe 73 communicating with the feed reservoir.

It will thus be seen that, by varying the level of water in chamber 63 the adjustable chamber is raised or lowered, thus regulating the pressure in cylinder 60 and consequently chamber 7 as desired.

The pressures above and below the main valve 27 may thus be balanced with facility.

When the buoyancy of the air pocket is insufficient to support the chamber 64, mechanical adjusting devices may be provided.

It will be appreciated that the chamber 63 must be so placed with respect to the agitating chamber 5 that the pressure may be varied within desired limits.

It will be appreciated that the upcast pipe 19, compressed air nozzle 33, and the conical valve 27, are each capable of vertical adjustment at the will of the operator, and the movement and position thereof is accurately indicated. Whilst the valve 27 is shut and air is blowing up the upcast pipe 19, a charge of ore is fed into the vessel 5, together with an amount of water to form a pulp of the required consistency.

The discharge of compressed air into the open end of the upcast pipe 19 causes a suction therein and a circulation of the pulp upward through the pipe discharging into the upper part of the chamber, then flowing downwards around the sides of the vessel, thereby maintaining an effective agitation of the pulp. To effect hydraulic classification or concentration the positions of the upcast pipe and the air nozzle discharging thereinto are adjusted so that falling particles of ore in the chamber meet the continuous horizontal current passing to the lower end of the upcast pipe. By careful adjustment of the positions of the upcast pipe and nozzle above indicated these forces counter to the force of gravity can be carefully adjusted to effect a graded settlement of the particles either according to size or gravity as may be required, the heavier particles by reason of their higher density being permitted to pass through the suction zone and accumulate in the apex of the cone.

In order to continuously withdraw the concentrates thus accumulating a hydrostatic head, equal in magnitude to the head at the lower end of the chamber 5, is established within the lower chamber 7 by adjusting the position of chamber 64 and opening communication between it and said chamber 7 by means of cock 51. When this has been effected the valve 27 is opened and the concentrates accumulating in the apex of the conical chamber gravitate into the lower chamber 7 and may be passed therefrom to the discharge cock 48 by means of the three-way cock 42. By adjusting the upcast pipe and the air nozzle from time to time progressive settlement of the ore particles may be effected, obtaining different grades of material, so that any degree of concentration can be effected.

When the apparatus is adapted for the metallurgical operation of amalgamation the valve 27 is opened and mercury is fed into the chamber 7 until it rises into the well formed by the neck 6. The air nozzle is then lowered below the level of the mercury in the well so that the mercury is blown up through the upcast tube in fine particles, thereby effecting a continuous agitation of the mercury with the ore particles. When the nozzle is raised to its normal position, that is to say, projecting just inside the upcast tube, agitation of the mercury is suspended and the same falls back into the well, together with such amalgam of precious metals as may have been effected. To improve amalgamation and keep the mercury clean and coherent a suitable electrolyte may be added to the ore pulp and an electrolytic current passed between the upcast pipe 19 as anode and the mercury in the well 6 as cathode.

Similarly for the metallurgical operation of cyanidation, a suitable cyanide solution is fed into the chamber and subjected to the necessary amount of aeration and agitation by means of the air discharged into the upcast pipe, so that the cyanide solution is effectively circulated, agitated and aerated with the ore pulp, whereby a solution of the precious metals is effected.

After solution of the precious metals has been obtained, an electrolytic current from a suitable E. M. F. is connected to the apparatus, the upcast pipe affording a suitable anode and the mercury within the well of the chamber being used as a cathode as above described. The current is passed so that the cyanide electrolyte is electrolyzed, causing an electro-deposition of the gold upon the mercury cathode. The gold amalgamates with this mercury and sinks below the surface thereof and is thus prevented from re-solution.

The cyanide solution may also be regenerated in this manner in the presence of a base, and furthermore cyanicides may be eliminated and extraction by cyanide improved in a well known manner. Alternatively the dissolved precious metals may be precipitated by adding copper or zinc dust and agitating for a short time with mercury.

When amalgam accumulates in the chamber 7 during any of the above mentioned amalgamating operations, it may be removed without interrupting such operations, by opening the door 47 at the end of the worm conveyor 44 and placing a filter bag e. g. chamois leather around annular flange forming the exit opening.

The three-way cock 42 is then adjusted to place the discharge chamber 41 into communication with auxiliary chambers 7 whereby the heavy amalgam will pass into the hopper feed so that same may be filled into the said bag upon operating the handwheel 45 of the worm conveyor.

The pressure of the ore pulp or the adjustable hydrostatic head may be employed to assist in this filtration of the amalgam.

If it is desired to filter the whole of the contents of the auxiliary chamber 7, such as when dealing with light amalgams, the terminal valve 27 is first closed, thus enabling the whole of the excess mercury to be filtered off into suitable receptacles, leaving the consolidated amalgam in the filter bag or bags.

Before discharging the ore pulp from the agitator chamber 5, any coarser sand sufficiently valuable for further treatment may be separated after first removing the mercury from the auxiliary chamber 7 by placing the latter into communication with the discharge cock 48 by means of the three-way cock 42.

The upcast pipe 19 and the air nozzle are then adjusted to effect the separation of the coarser sand as previously described.

The remaining ore pulp may be discharged through the pipe 56 as previously described.

When the apparatus is employed for separation by flotation the hydrostatic head is first adjusted to balance the ore pulp column and is then shut off, the valve 27 is also closed and communication is established between the auxiliary chamber 7 and an elevated reservoir of a suitable flotation agent by means of a supply pipe 70ª.

The valve 27 is then opened very slightly to permit the passage of oil or other flotation agent into the upper vessel and at the same time a vigorous agitation and aeration is maintained by means of the air pipe 32. The supply of oil or other flotation agent is then shut off and communication is re-established with the hydrostatic head which is raised sufficiently to permit of the float concentrate being discharged into the overflow launder 57.

In use the apparatus may be employed for continuous treatment but as illustrated is especially adapted for intermittent treatment, being charged, treated, and discharged in batches. The apparatus may be adapted for grading sands, removing concentrates from ores, separation by flotation, amalgamation, cyanidation and the electro-deposition of the precious metals from the electrolyte. These operations may be done in succession, provided that the chamber is cleaned out after treatment for concentrates and charged with mercury.

In lieu of circulating the ore pulp by means of air passing through the pipe 32 it will be obvious that water under pressure may be forced therethrough.

I claim:—

1. In apparatus for the treatment of ores, the combination with a main chamber having a converging bottom and an upcast pipe arranged therein, means for adjusting the vertical position of the said upcast pipe, a circulating pipe delivering fluid under pressure into the lower end of the said upcast pipe to cause a circulation of the contents of the said chamber, means for regulating the vertical position of the said circulating pipe, an auxiliary chamber below the said main chamber and a valve for controlling the communication between said main chamber and the said auxiliary chamber.

2. In apparatus for the treatment of ores, the combination with a main chamber having a converging bottom and an upcast pipe arranged therein, means for adjusting the vertical position of the said upcast pipe, a compressed air pipe delivering air into the lower end of the said upcast pipe to cause a circulation of the contents of the said chamber, means for regulating the vertical position of the said compressed air pipe, an auxiliary chamber below the said main chamber, a valve for controlling the communication between said main chamber and the said auxiliary chamber, and means for regulating and equalizing the hydrostatic pressure in the said auxiliary chamber and the said main chamber.

3. In apparatus for the treatment of ores, the combination with a main chamber having a converging bottom and an upcast pipe arranged therein, means for adjusting the vertical position of the said upcast pipe, a compressed air pipe delivering air into the lower end of the said upcast pipe, to cause a circulation of the contents of the said chamber, means for regulating the vertical position of the said compressed air pipe, an auxiliary chamber below the said main chamber, a valve for controlling the communication between said main chamber and the said auxiliary chamber, means for regulating and equalizing the hydrostatic pressure in the said auxiliary chamber and the said main chamber, means for withdrawing concentrates and grades of material from the said auxiliary chamber, means for delivering mercury to the said main chamber and causing an agitation thereof with the contents of the said chamber for effecting an amalgamation of the precious metals contained therein, and means for withdrawing the said mercury.

4. In apparatus for the treatment of ores, the combination with a main chamber having a converging bottom and an upcast pipe arranged therein, means for adjusting the vertical position of the said upcast pipe, a compressed air pipe delivering air into the lower end of the said upcast pipe to cause a circulation of the contents of the said chamber, means for regulating the vertical position of the said compressed air pipe, an auxiliary chamber below the said main chamber, a valve for controlling the communication between said main chamber and the said auxiliary chamber, means for regulating and equalizing the hydrostatic pressure in the said auxiliary chamber and the said main chamber, means for withdrawing concentrates and grades of material from the said auxiliary chamber, means for delivering mercury to the said main chamber and causing an agitation thereof with the contents of the said chamber for effecting an amalgamation of the precious metals contained therein, means for withdrawing the said mercury, means for passing an electric current from the said upcast pipe as anode to the said mercury as cathode, the said upcast pipe and the upper portion of the chamber being electrically insulated from the lower portion.

5. In apparatus for the treatment of ores, the combination with a main chamber having a converging bottom and an upcast pipe arranged therein, means for adjusting the vertical position of the said upcast pipe, a compressed air pipe delivering air into the lower end of the said upcast pipe to cause a circulation of the contents of the said chamber, means for regulating the vertical position of the said compressed air pipe, an auxiliary chamber below the said main chamber, a valve for controlling the communication between said main chamber and the said auxiliary chamber, means for regulating and equalizing the hydrostatic pressure in the said auxiliary chamber and the said main chamber, means for withdrawing concentrates and grades of material from the said auxiliary chamber, means for delivering mercury to the said main chamber and causing an agitation thereof with the contents of the said chamber for effecting an amalgamation of the precious metals contained therein, means for withdrawing the said mercury, means for passing an electric current from the said upcast pipe as anode to the said mercury as cathode, the said upcast pipe and the upper portion of the chamber being electrically insulated from the lower portion, means for delivering solvent solutions of an alkaline cyanide into the said main chamber for effecting a solution of the precious metals and for subsequently electro-depositing the precious metals from the said electrolyte.

6. In apparatus for the treatment of ores according to claim 2, a tubular stem supporting the valve and passing through the bottom of the auxiliary chamber, an externally threaded portion at the lower end of the tubular stem, a worm wheel having a threaded bore engaging the said screwed stem, a manually controlled worm engaging the worm wheel, and means for preventing the angular displacement of the said screwed stem.

7. In apparatus for the treatment of ores according to claim 2, a tubular stem supporting the valve and passing through the bottom of the auxiliary chamber, means associated with the lower end of the tubular stem for raising and lowering the valve, a compressed air pipe passing centrally through the tubular stem and the said valve, a nozzle on the upper end of the said pipe, and manually operated means associated with the lower projecting end of said pipe for raising and lowering the same.

8. In apparatus for the treatment of ores according to claim 3, a compartment arranged below the auxiliary chamber, a valve for placing the said compartment in communication with the auxiliary chamber whereby mercury and amalgam may be discharged therefrom, an exit opening in the compartment and a conveyor for discharging the contents of the compartment through the exit opening.

9. In apparatus for the treatment of ores according to claim 3, a sloping bottom for the auxiliary chamber, a compartment arranged below the said auxiliary chamber, an exit opening for the compartment, a screw conveyor for discharging the contents of the compartment through the exit opening, a discharge cock, a passage leading to the discharge cock, and a valve for placing the auxiliary chamber into communication either with the said passage or the said compartment.

10. In apparatus for the treatment of ores according to claim 3, a vessel adapted to be placed in communication with the auxiliary chamber, a pipe communicating at its lower end with the vessel, a vertically adjustable chamber associated with the opposite end of the pipe, and means for maintaining a predetermined level of water in the said chamber.

11. In apparatus for the treatment of ores according to claim 3, a vessel adapted to be placed in communication with the auxiliary chamber for the supply of water under pressure thereto, a pipe communicating at its lower end with the vessel, a vertically adjustable chamber associated with the upper end of the pipe, means for maintaining a predetermined level of water in the vertically adjustable chamber, a further chamber accommodating the vertically adjustable chamber, and means for delivering water to and discharging it from the said chamber.

12. In apparatus for the treatment of ores according to claim 3, a vessel adapted to be placed in communication with the auxiliary chamber for the supply of water under pressure thereto, a pipe communicating at its lower end with the vessel, a vertically adjustable chamber communicating with the upper end of said pipe, means for maintaining a predetermined level of water in the adjustable chamber, an annular skirt depending from the adjustable chamber, a further chamber accommodating the adjustable chamber, and means for supplying water to said chamber and discharging it therefrom as required.

13. In apparatus for the treatment of ores according to claim 3, an elevated reservoir for mercury, a pipe connecting the reservoir and the auxiliary chamber, and a valve in said pipe for permitting the passage of mercury to said auxiliary chamber when desired.

14. In apparatus for the treatment of ores according to claim 3, an elevated reservoir for a flotation agent, a pipe connecting said reservoir with the auxiliary chamber, and a valve for permitting the passage of said flotation agent into the auxiliary chamber when required.

15. In apparatus for the treatment of ores according to claim 3, an overflow launder surrounding the upper end of the main chamber, and a discharge opening in the said launder.

16. In apparatus for the treatment of ores according to claim 2, a vertical spindle attached to the upcast pipe and having its upper threaded end projecting through the top of the main chamber, a worm wheel having a threaded bore engaging the said spindle, a worm engaging the worm wheel, and means for operating the worm to raise and lower the upcast pipe.

In witness whereof I hereunto affix my signature.

NORMAN LESLIE.